United States Patent
Psaroudakis et al.

(10) Patent No.: US 11,829,419 B1
(45) Date of Patent: Nov. 28, 2023

(54) MANAGING HYBRID GRAPH DATA STORAGE AND RETRIEVAL FOR EFFICIENT GRAPH QUERY EXECUTION

(71) Applicant: ORACLE INTERNATIONAL CORPORATION, Redwood Shores, CA (US)

(72) Inventors: Iraklis Psaroudakis, Zurich (CH); Mhd Yamen Haddad, Massy (FR); Martin Sevenich, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/744,653

(22) Filed: May 14, 2022

(51) Int. Cl.
*G06F 16/23* (2019.01)
*G06F 16/901* (2019.01)
*G06F 16/903* (2019.01)

(52) U.S. Cl.
CPC .......... *G06F 16/9024* (2019.01); *G06F 16/23* (2019.01); *G06F 16/90335* (2019.01)

(58) Field of Classification Search
CPC . G06F 16/9024; G06F 16/23; G06F 16/90335
See application file for complete search history.

(56) References Cited

U.S. PATENT DOCUMENTS

| | | | |
|---|---|---|---|
| 7,523,117 B2* | 4/2009 | Zhang | G06F 18/2323 |
| 10,268,776 B1* | 4/2019 | Johnson | G06F 16/9014 |
| 10,915,578 B1* | 2/2021 | Hunter | G06N 3/006 |
| 11,379,468 B1* | 7/2022 | Zhang | G06F 16/9024 |
| 2011/0029571 A1* | 2/2011 | Aggarwal | G06F 16/9024 707/798 |
| 2017/0060958 A1* | 3/2017 | Van Rest | G06F 16/9024 |
| 2017/0169133 A1* | 6/2017 | Kim | G06F 16/9024 |
| 2017/0286866 A1* | 10/2017 | Bhowan | G06F 16/9024 |
| 2017/0323463 A1* | 11/2017 | Leiba | G06F 3/04845 |
| 2019/0205480 A1* | 7/2019 | Zhang | G06F 16/9024 |
| 2020/0151216 A1* | 5/2020 | Sevenich | G06F 16/2219 |
| 2020/0387548 A1* | 12/2020 | Han | G06F 16/90335 |
| 2021/0064660 A1* | 3/2021 | Xu | G06F 16/903 |

(Continued)

OTHER PUBLICATIONS

O'Neil et al., "The LRU-K Page Replacement Algorithm for Database Disk Buffering", ACM SIGMOD Record, vol. 22, Iss. 2, DOI:/10.1145/170036.170081, dated Jun. 1993, 10 pages.

(Continued)

*Primary Examiner* — Jorge A Casanova
(74) *Attorney, Agent, or Firm* — Hickman Becker Bingham Ledesma LLP

(57) ABSTRACT

A system for loading graph data from an external store in response to a graph query is disclosed. In some embodiment, given a graph database where all vertices are stored in memory and some but not all edges are stored in the external store, the system performs one of two methods. In the first method, the system iteratively expands a set of vertices that is initially specified in the graph query and collects all edges connected to the set of vertices, including edges stored in the external store, that satisfy a vertex constraint also specified in the query. In the second method, the system finds a set of vertices that satisfy the vertex constraint and collects all edges connected to the set of vertices, including edges stored in an external store.

22 Claims, 3 Drawing Sheets

(56) References Cited

U.S. PATENT DOCUMENTS

2021/0073285 A1\* 3/2021 Hunter ..................... G06F 8/65
2021/0224235 A1\* 7/2021 Arnaboldi ............... G06F 16/27

OTHER PUBLICATIONS

Neo4j.com, "What is a Graph Database?", https://neo4j.com/developer/graph-database!, retrieved May 23, 2022, 7 pages.

Levandoski et al., "Identifying Hot and Cold Data in Main-Memory Databases", Proceedings of the 2013 IEEE International Conference on Data Engineering, DOI: 10.1109/ICDE.2013.6544811, dated Apr. 2013, 12 pages.

Gedik et al., "Disk-Based Management of Interaction Graphs", IEEE Transactions on Knowledge and Data Engineering, vol. 26, No. 11, DOI: 10.1109/TKDE.2013.2297930, dated Nov. 2014, 14 pages.

\* cited by examiner

FIG. 2

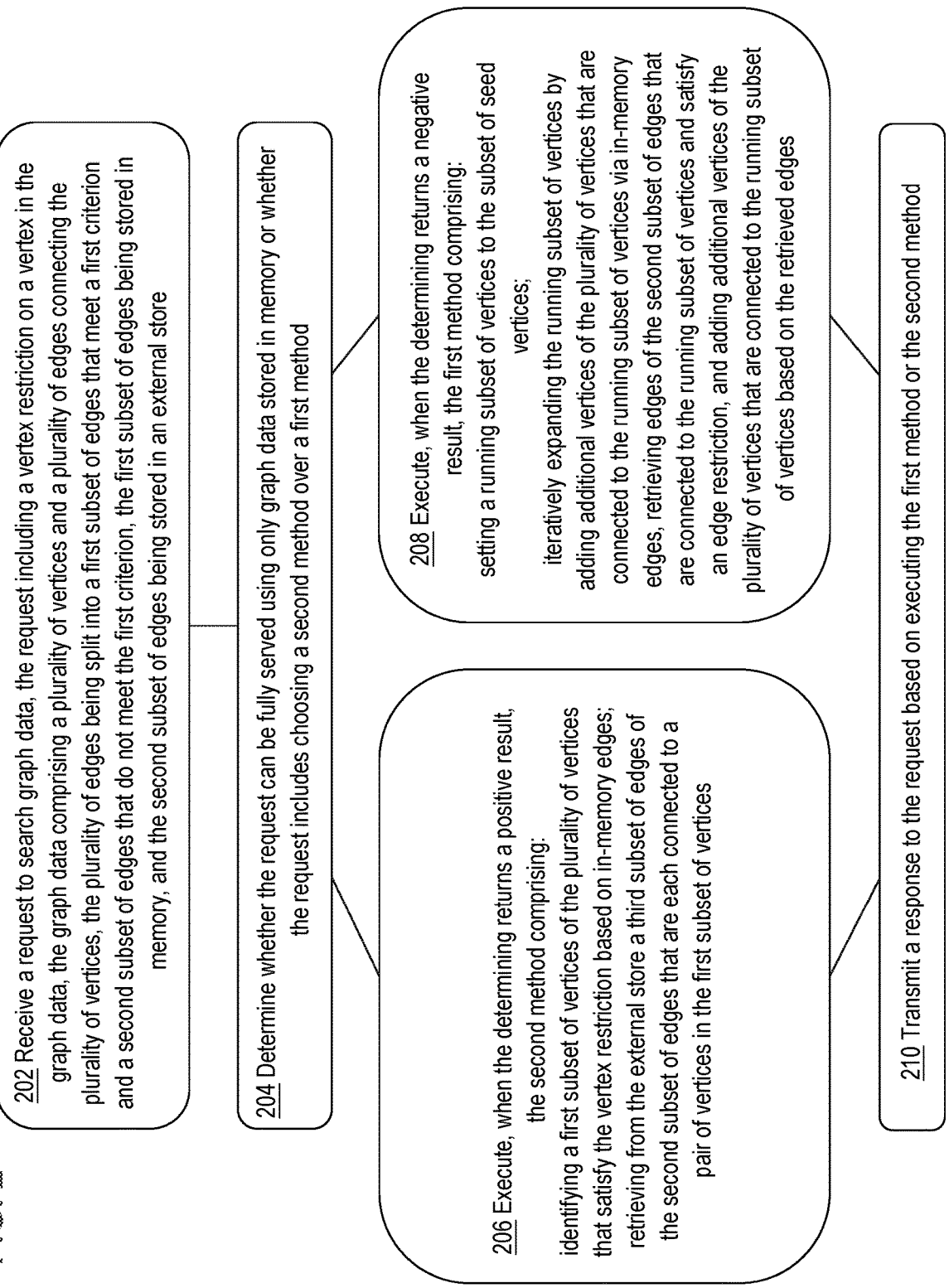

202 Receive a request to search graph data, the request including a vertex restriction on a vertex in the graph data, the graph data comprising a plurality of vertices and a plurality of edges connecting the plurality of vertices, the plurality of edges being split into a first subset of edges that meet a first criterion and a second subset of edges that do not meet the first criterion, the first subset of edges being stored in memory, and the second subset of edges being stored in an external store 204 Determine whether the request can be fully served using only graph data stored in memory or whether the request includes choosing a second method over a first method 206 Execute, when the determining returns a positive result, the second method comprising:
identifying a first subset of vertices of the plurality of vertices that satisfy the vertex restriction based on in-memory edges; retrieving from the external store a third subset of edges of the second subset of edges that are each connected to a pair of vertices in the first subset of vertices 208 Execute, when the determining returns a negative result, the first method comprising:
setting a running subset of vertices to the subset of seed vertices;
iteratively expanding the running subset of vertices by adding additional vertices of the plurality of vertices that are connected to the running subset of vertices via in-memory edges, retrieving edges of the second subset of edges that are connected to the running subset of vertices and satisfy an edge restriction, and adding additional vertices of the plurality of vertices that are connected to the running subset of vertices based on the retrieved edges 210 Transmit a response to the request based on executing the first method or the second method

MANAGING HYBRID GRAPH DATA STORAGE AND RETRIEVAL FOR EFFICIENT GRAPH QUERY EXECUTION

FIELD OF THE INVENTION

The techniques and approaches described herein, relate to the field of construction and utilization of graph databases, particularly improving graph query execution.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graph databases are gaining popularity nowadays because they permit graph analysis to reveal latent information that is encoded, not as fields in the data, but as direct and indirect relationships between elements of the data.

Disk-based graph databases tend to be slow in executing graph queries as the data is stored on disk. In-memory databases, where data is stored in memory, result in faster execution of graph queries and thus faster analytics. However, fast growth of the graph data may require too much memory to be efficient in cost or implementation. It would be helpful to have an effective approach of storing and utilizing some of the graph data out of memory.

BRIEF DESCRIPTION OF THE DRAWINGS

In the drawings of certain embodiments in which like reference numerals refer to corresponding parts throughout the figures:

FIG. 2 illustrates an example process of managing graph data according to embodiments disclosed herein.

DETAILED DESCRIPTION

Figure 1:
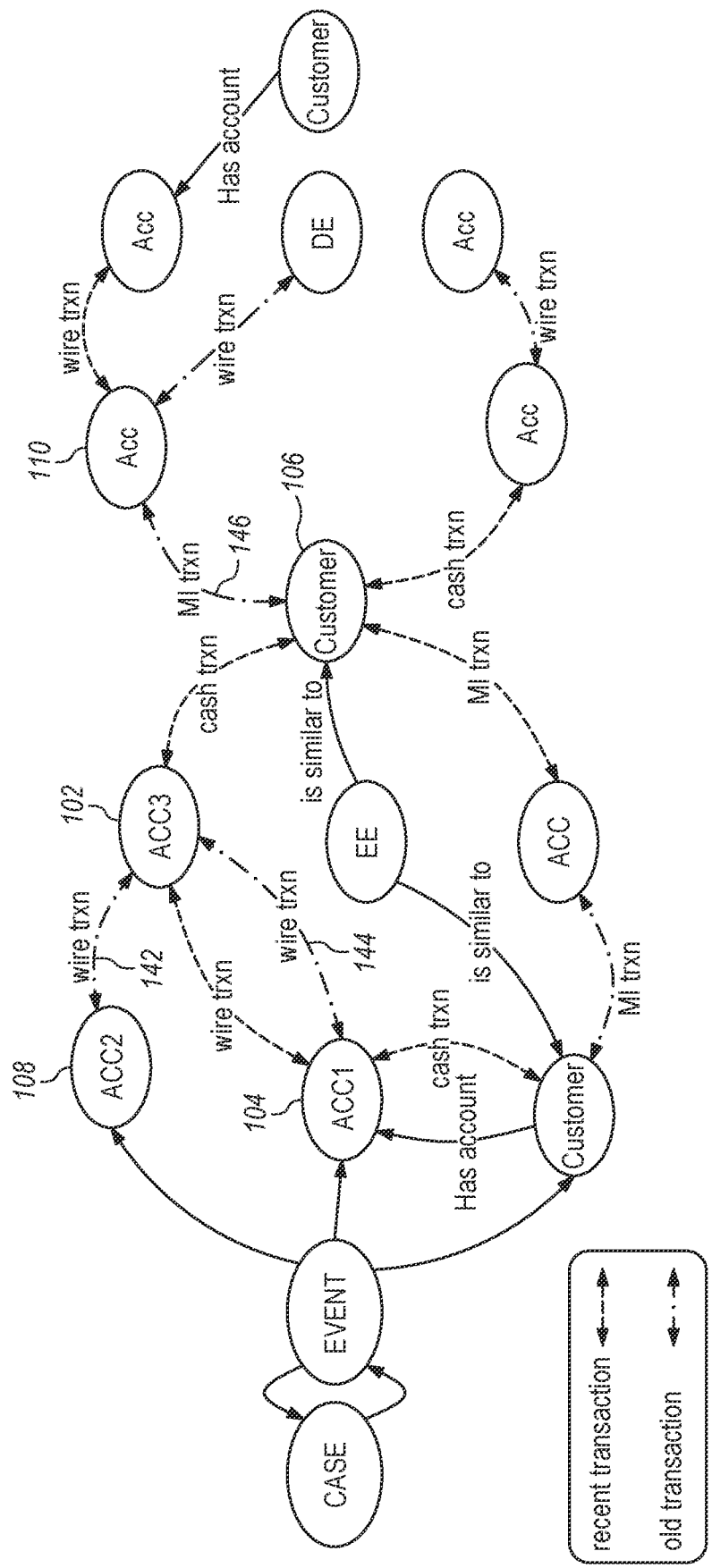
FIG. 1 illustrates an example graph.

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

A system for loading graph data from an external store in response to a graph query is disclosed. In some embodiment, given a graph database where all vertices are stored in memory and some but not all edges are stored in the external store, the system performs one of two methods. In the first method, the system iteratively expands a set of vertices that is initially specified in the graph query and collects all edges connected to the set of vertices, including edges stored in the external store, subject to any vertex or edge constraint also specified in the query. In the second method, the system finds a set of vertices that satisfy the vertex constraint and collects all edges connected to the set of vertices, including edges stored in an external store.

One use case involves financial graphs that are often used for fraud detection. Other use cases are available. These financial graphs contain data related to transactions between entities (e.g., persons or institutions), where the entities are modeled as vertices or nodes and the transactions are modeled as edges for fraud investigations. Financial applications that perform investigation and analytics on large financial graphs typically focus on a N-hop neighborhood (through N edges) around initial vertices of interest, and focus on recent transaction edges rather than old ones.

One issue with financial graphs, for example, is that the number of edges can easily exceed the limits of a machine's memory. Even when the edges can be stored in memory, it would be a waste since only a small fraction of the edges will be used for a particular investigation. Moreover, older transaction edges are far less important for investigations compared to newer edges, even if older transaction edges may need to be accessed to establish a more complete picture for the investigation.

Therefore, to accommodate fast processing in memory, the system according to various embodiments disclosed herein offloads the bulk of older transaction edges to an external store, and keeps only recent transaction edges in the financial graph in memory. In case older transaction edges are needed for some investigations, the system builds an in-memory subgraph from the financial graph and enhances it with offloaded transaction edges from the external store. The system can build the subgraph using one of at least two methods. The resulting subgraph can contain all vertices and edges that can be reached within N hops from the initial vertices subject to any given vertex or edge constraint.

In this hybrid architecture, part of the graph is stored in memory for fast execution and querying, and the other part is stored externally in order to allow the system to store very large graphs. The system uses the two methods to determine which offloaded edges to load into memory in response to graph queries. These two methods generally do not depend on the access patterns of the edges, such as whether an edge is most accessed during a period of time or whether the edge is last accessed. Instead, the two methods specify how to offload edges in advance and how to retrieve them based on a given graph query, which are thus more flexible and more tailored to individual graph queries.

The system reduces memory requirement of using in-memory graph databases. Offloading part of the graph data to an external store increases the efficiency of installing and maintaining big memories. Intelligently loading select offloaded edges into memory in response to a graph query enables responding to the graph query without unnecessary overhead. Compared with the first method, the second method requires less time at the expense of a less precise response to the graph query. Overall, both methods result in improved execution of graph queries by achieving a good balance of in-memory usage and external store usage. Compared with conventional approaches, offloading of graph data to the external store in a one-off fashion avoids repeated memory access.

Handling Graph Queries with Hybrid Graph Data Storage

In some embodiments, a database system stores graph data using the hybrid approach, where all the vertices and some edges are stored in memory and some edges are stored in an external store. The edges that are stored in the external store can be referred to as "offloaded edges". The vertices represent entities, such as accounts or events, and the edges represent relationships. Each edge can be one of different types and has one or more attributes. For example, a first edge can be of the type indicating that two entities are "similar to" each other, and a second edge can be of the type indicating that two entities were "parties of a transaction". The second edge can have an attribute indicating the transaction "date" and another attribute indicating the transaction "dollar amount". The database system can be configured with an offset value and a buffer value. The offset determines which edges will be stored in memory. The buffer is used to allow some leeway instead of a hard cutoff after the offset. The edges stored in memory can also be stored in simpler forms in the external store for backup purposes.

In some embodiments, the external store allows edges to be searched based on given vertices. For example, the search criteria can specify that at least one side of an edge is connected to one of the given vertices. The external store also allows edges to be searched based on given edge restrictions. For example, the search criteria can specify that an edge is to have a value for the date attribute that falls in a given time range.

In some embodiments, then, a graph G(V, E1, E2) comprises a set of vertices G, a set of edges E1 that are stored in memory, and a set of edges E2 that are stored in the external store. For example, E1 can comprise every edge that is either not of the "parties of a transaction" type or is of that type with the value of the date attribute being no earlier than 365 days (offset value being equal to 365 days) prior to the current date. E2 can then comprise every edge that is of the "parties of a transaction" type with the value of the date attribute being earlier 185 days (difference between the offset value and the buffer value, the latter being 180 days) prior to the current date.

In some embodiments, a graph query can be expressed in terms of S, N, and T, where S denotes a subset of seed vertices in G, N denotes a set of vertex restrictions, such as a number of hops from a vertex in S, and T denotes a set of edge restrictions, such as an effective date range. Two methods are described below to determine, for a given graph query, how to load offloaded edges into memory in response to the graph query, the first method being subgraph creation with traversing external edges and the second method being subgraph creation without traversing external edges. Each of these methods involves maintaining a frontier as a subset of vertices initially set to S while marking all visited vertices.

In some embodiments, in response to receiving a graph query, the database system can choose one of the two methods. For example, when no traversing external edges is separately requested or when the in-memory graph can fully serve a graph query (e.g., including all the edges having the value of the date attribute in the specified time range), the database system can apply the second method; otherwise, the database can apply the first method. The graph data stored in memory and the graph data stored in the external store remain unchanged. However, in response to the graph query, certain offloaded edges can be retrieved from the external store and added to this subgraph that is returned as the response to the graph query.

FIG. 1 illustrates an example graph. S can comprise the vertex 102, N can be one hop from a seed vertex, and T can be a certain time range. The edges corresponding to old transactions are stored in the external store while all the other edges are stored in memory. All edges satisfy T in this example graph.

Subgraph Creation with Traversing External Edges

In some embodiments, the database system creates a "distance" variable that stores the distance (number of hops) of a vertex in the graph G from any seed vertex in S. The distance of each seed vertex is set to zero, and initially to a maximum possible value for all other vertices.

In the example graph, the frontier now comprises 102 only. The distance variable is set to zero for the vertex 102 and the maximum possible value for other vertices.

In some embodiments, the database system then iteratively expands the frontier until the frontier does not change any more. In each iteration, the database system searches all in-memory vertices that are connected to a vertex via in-memory edges in the frontier and add those vertices to the frontier. Two vertices are "connected" when they are on two ends of an edge unless otherwise specified. The database system then loads all edges from the external store that satisfy T and that are connected to a vertex in the frontier. When the vertex at other side of the edge has not been visited yet, the vertex is added to the frontier. The distance of each vertex in the frontier is then set to the current distance plus one.

In the example graph, in the first iteration, the database system adds the vertices 104 and 106 to the frontier. The database then loads edges 142, 144, and 146. The database system then adds the vertices 108 and 110 to the new frontier. The distance variable is set to one for each of the vertices 104, 106, and 108, and is set to two for the vertex 110.

In some embodiments, after iterations, the database system then creates a subgraph using all the vertices where the distance variable has been set to a value smaller or equal than a number specified in N. The database system also adds all the external edges that have been loaded during the iterations to the subgraph. The added edges can also be limited to those that connect the vertices in the subgraph. The resulting subgraph is then formed using both offloaded edges and in-memory edges. Ultimately, the database system loads all the offloaded edges that are part of a full response to the graph query.

In the example graph, after one iteration, the database system creates a subgraph comprising the vertices 102, 104, 106, and 108 and at least the edges 142 and 144.

Sub Graph Creation without Traversing External Edges

In some embodiments, the database system generates a subgraph comprising all the in-memory vertices that satisfy N based on in-memory edges. Such identification can be performed within the graph pattern query language (PGQL) or using a breadth-first-search (BFS) algorithm.

In the example graph, the database system generates a subgraph comprising the vertices 102, 104, and 106.

In some embodiments, the database system then searches the external store for all the offloaded edges that connect two vertices in the subgraph and add those to the subgraph. Ultimately, the database system does not load all the offloaded edges that are part of a full response to the graph query and thus takes less time. While this subgraph might contain less information than the subgraph created using the first method, this subgraph can be computed much faster, which can be desirable during early explorations of the graph data before doing an in-depth investigation where the whole picture is required.

In the example graph, the database system then adds the edge 144 to the subgraph. Compared with the subgraph created using the first method, the second method generates a subgraph that is missing at least the vertex 108 and the edges 142 and 144.

Graph Database Update

Relevant data, such as data representing transactions, can be created all the time. In some embodiments, the graph database is updated as requested or based on a schedule. The update can include storing new data in memory, such as vertices and edges representing more recent transactions, offloading data from the memory to the external store, such as edges representing older transactions, or removing old data from the external store, such as edges representing ancient transactions.

In some embodiments, the database system can maintain two sliding windows, the first sliding window related to offloading data from the memory to the external store, and the second sliding window related to removing data from the external store. The sliding amount can depend on the update schedule. The sliding window sizes can depend on the features distinguishing E1 and E2 as well as desired sizes of E1 and E2.

In some embodiments, data in the graph database can be organized to facilitate the offloading and removal. For example, when the difference between E1 and E2 is based on the data attribute of the edges of the "parties of a transaction" type, the sliding amount is one day, and the size of the second sliding window is expressed in years, data stored in memory can be organized by day (and possibly values of other edge attributes), while data stored in the external store can be organized by year (and possibly values of other edge attributes). When the size of the first sliding window is one year, and that of the second sliding window is seven years (and the buffer value is zero), for example, those edges that represent transactions that are within one year old are stored in memory, those edges that represent transactions that are between one year old and seven years old are stored in the external data store, and the rest of the edges are discarded.

Example Processes

FIG. 2 illustrates an example process of managing graph data according to embodiments disclosed herein.

In some embodiments, the system receives the graph data that comprises a plurality of vertices and a plurality of edges connecting the plurality of vertices. The system then splits the plurality of edges into the first subset of edges and the second subset of edges, and stores the plurality of vertices in memory, the first subset of edges in memory, and the second subset of edges in the external store.

At block 202, a system receives a request to search graph data, the request including a vertex restriction on a vertex in the graph data. The plurality of edges is split into a first subset of edges that meet a first criterion and a second subset of edges that do not meet the first criterion.

In some embodiments, the request further indicates a subset of seed vertices of the plurality of vertices. The vertex restriction is no more than a certain number of edges away from a vertex in the subset of seed vertices.

At block 204, the system determines whether the request can be fully served using only graph data stored in memory or whether the request includes choosing a second method over a first method.

At block 206, the system executes, when the determining returns a positive result, the second method. Specifically, the system identifies a first subset of vertices of the plurality of vertices that satisfy the vertex restriction based on in-memory edges and retrieves from the external store a third subset of edges of the second subset of edges that are each connected to a pair of vertices in the first subset of vertices.

In some embodiments, the request further includes an edge restriction. The third subset of edges also satisfies the edge restriction. Each edge of the plurality of edges has a timing attribute. The first criterion specifies a first time range. The edge restriction specifies a second time range.

At block 208, the system executes, when the determining returns a negative result, the first method. Specifically, the system sets a running subset of vertices to the subset of seed vertices and iteratively expands the running subset of vertices by adding additional vertices of the plurality of vertices that are connected to the running subset of vertices via in-memory edges, retrieving edges of the second subset of edges that are connected to the running subset of vertices and satisfy an edge restriction, and adding additional vertices of the plurality of vertices that are connected to the running subset of vertices based on the retrieved edges.

At block 210, the system transmits a response to the request based on executing the first method or the second method.

In some embodiments, the system identifies a fourth subset of edges of the first subset of edges that are each connected to a pair of vertices in the first subset of vertices. The response then includes the first subset of vertices, the third subset of edges, and the fourth subset of edges. In other embodiments, the response includes a subset of vertices of the plurality of vertices that satisfy the vertex restriction and a subset of the plurality of edges that connect the subset of vertices.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
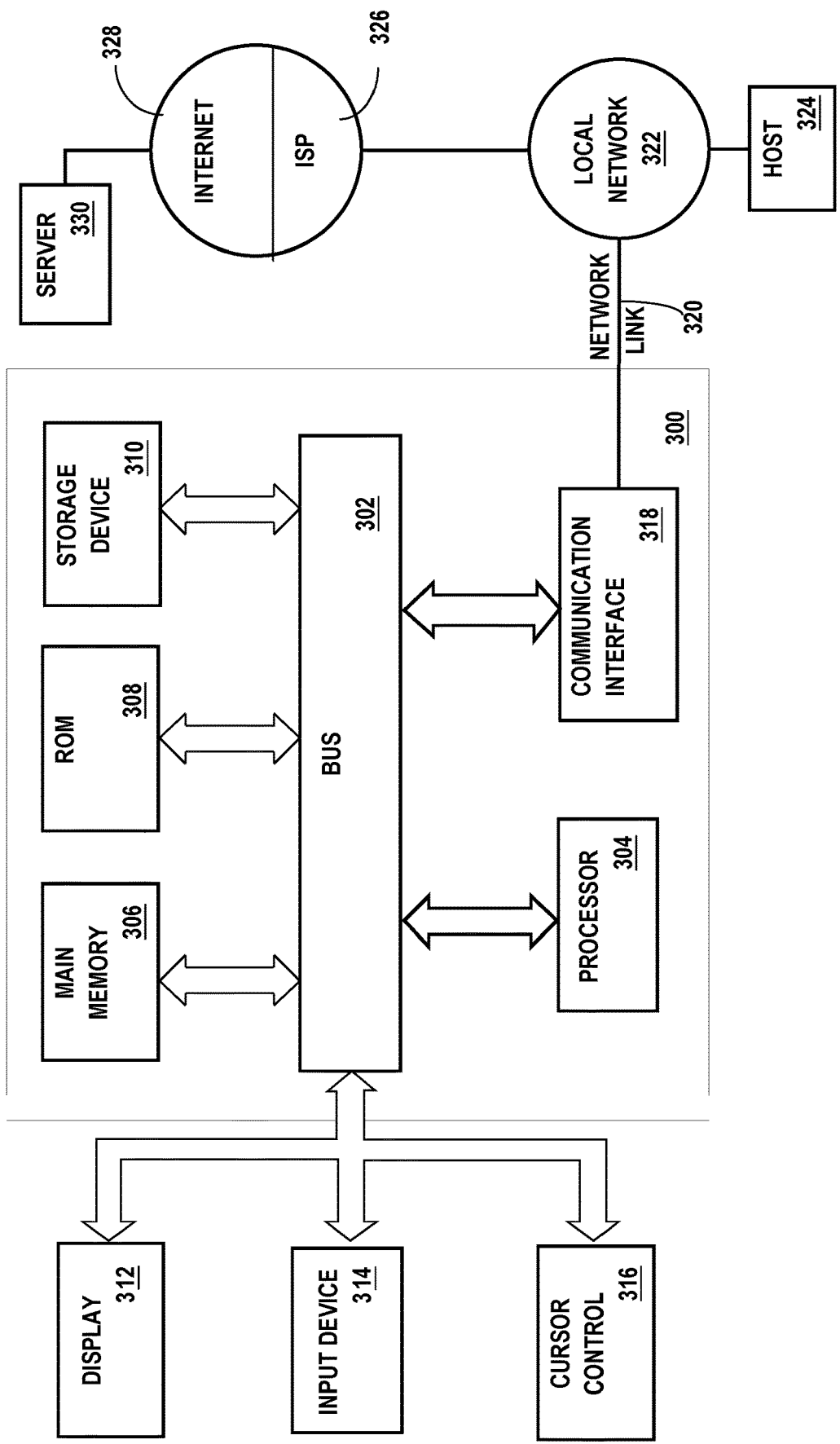
FIG. 3 is a block diagram that illustrates a computer system upon which an embodiment of the approach may be implemented.

For example, FIG. 3 is a block diagram that illustrates a computer system 300 upon which an embodiment of the approach may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Cloud Computing Overview

The techniques described herein are implemented using one or more processing solutions, examples of which include distributed systems, clustered computing systems, and cloud computing systems. In an embodiment, database management system 100 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to database management system 100, or to other entities within this description, is controllable via an interface that is exposed at a cloud computing system.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A computer-implemented method of managing graph data, comprising:
receiving graph data comprising a plurality of vertices and a plurality of edges connecting the plurality of vertices;
dividing the plurality of edges into a first subset of edges that meet a first criterion and a second subset of edges that do not meet the first criterion;
storing the plurality of vertices in memory, the first subset of edges in memory, and the second subset of edges in an external store;
receiving a request to search graph data, the request including a vertex restriction on a vertex in the graph data;
identifying a first subset of vertices of the plurality of vertices that satisfy the vertex restriction based on the first subset of edges;
retrieving from the external store a third subset of edges of the second subset of edges that are each connected to a pair of vertices in the first subset of vertices;
adding the first subset of vertices to a subgraph;
iteratively adding each vertex connected to the subgraph based on in-memory edges, retrieving from the external store each edge of the second subset of edges that is connected to the subgraph, adding the retrieved edges to the subgraph, and adding each additional vertex of the plurality of vertices that is connected to the subgraph to the subgraph, until no vertex that satisfies the vertex restriction is not already in the subgraph;
transmitting a response to the request based on the first subset of vertices and the third subset of edges.

2. The computer-implemented method of claim 1,
the request further including an edge restriction,
the third subset of edges also satisfying the edge restriction.

3. The computer-implemented method of claim 1,
each edge of the plurality of edges having a timing attribute,
the first criterion specifies a time range.

4. The computer-implemented method of claim 1,
the request further indicating a subset of seed vertices of the plurality of vertices,
the vertex restriction being no more than a certain number of edges away from a vertex in the subset of seed vertices.

5. The computer-implemented method of claim 1, further comprising
identifying a fourth subset of edges of the first subset of edges that are each connected to a pair of vertices in the first subset of vertices,
the response including the first subset of vertices, the third subset of edges, and the fourth subset of edges.

6. The computer-implemented method of claim 1, further comprising:
receiving an update schedule, a second criterion, and a third criterion;
at a time on the update schedule, loading new data into a memory, offloading graph data that satisfy the second criterion to the external store, and removing graph data that satisfy the third criterion from the external store.

7. The computer-implemented method of claim 1,
the subgraph including a vertex that satisfies the vertex restriction but a path from the vertex to the first subset of vertices includes an edge in the second subset of edges.

8. A computer-implemented method of managing graph data, comprising:
receiving graph data comprising a plurality of vertices and a plurality of edges connecting the plurality of vertices;
dividing the plurality of edges into a first subset of edges that meet a first criterion and a second subset of edges that do not meet the first criterion;
storing the plurality of vertices in memory, the first subset of edges in memory, and the second subset of edges in an external store;
receiving a request to search graph data, the request including a vertex restriction on a vertex in the graph data, an edge restriction on an edge in the graph data, and a subset of seed vertices of the plurality of vertices;
setting a running subset of vertices to the subset of seed vertices;
iteratively expanding the running subset of vertices by adding additional vertices of the plurality of vertices that are connected to the running subset of vertices via in-memory edges, retrieving edges of the second subset of edges that are connected to the running subset of vertices and satisfy the edge restriction, and adding additional vertices of the plurality of vertices that are connected to the running subset of vertices based on the retrieved edges;
transmitting, after the iteratively expanding, a response to the request based on the running subset of vertices and the retrieved edges.

9. The computer-implemented method of claim 8,
each edge of the plurality of edges having a dollar amount attribute,
the edge restriction being a price range.

10. The computer-implemented method of claim 8, the vertex restriction being no more than a certain number of edges away from a vertex in the subset of seed vertices.

11. The computer-implemented method of claim 8, further comprising
after the iteratively expanding, identifying a third subset of edges of the first subset of edges that are each connected to a pair of vertices in the running subset of vertices,
the response including the running subset of vertices that satisfy the vertex restriction, the retrieved edges, and the third subset of edges.

12. A non-transitory computer-readable storage medium storing one or more sequences of instructions that, when executed by one or more computing devices, cause:
receiving graph data comprising a plurality of vertices and a plurality of edges connecting the plurality of vertices;
dividing the plurality of edges into a first subset of edges that meet a first criterion and a second subset of edges that do not meet the first criterion;
storing the plurality of vertices in memory, the first subset of edges in memory, and the second subset of edges in an external store;
receiving a request to search graph data, the request including a vertex restriction on a vertex in the graph data;
identifying a first subset of vertices of the plurality of vertices that satisfy the vertex restriction based on the first subset of edges;

retrieving from the external store a third subset of edges of the second subset of edges that are each connected to a pair of vertices in the first subset of vertices;

adding the first subset of vertices to a subgraph;

iteratively adding each vertex connected to the subgraph based on in-memory edges, retrieving from the external store each edge of the second subset of edges that is connected to the subgraph, adding the retrieved edges to the subgraph, and adding each additional vertex of the plurality of vertices that is connected to the subgraph to the subgraph, until no vertex that satisfies the vertex restriction is not already in the subgraph;

transmitting a response to the request based on the first subset of vertices and the third subset of edges.

13. The non-transitory computer-readable storage medium of claim 12, the request further including an edge restriction, the third subset of edges also satisfying the edge restriction.

14. The non-transitory computer-readable storage medium of claim 12, each edge of the plurality of edges having a timing attribute, the first criterion specifies a time range.

15. The non-transitory computer-readable storage medium of claim 12, the request further indicating a subset of seed vertices of the plurality of vertices, the vertex restriction being no more than a certain number of edges away from a vertex in the subset of seed vertices.

16. The non-transitory computer-readable storage medium of claim 12, the one or more sequences of instructions including instructions that, when executed by one or more computer devices, causes:

identifying a fourth subset of edges of the first subset of edges that are each connected to a pair of vertices in the first subset of vertices, the response including the first subset of vertices, the third subset of edges, and the fourth subset of edges.

17. The non-transitory computer-readable storage medium of claim 12, the one or more sequences of instructions including instructions that, when executed by one or more computer devices, causes:

receiving an update schedule, a second criterion, and a third criterion;

at a time on the update schedule, loading new data into a memory, offloading graph data that satisfy the second criterion to the external store, and removing graph data that satisfy the third criterion from the external store.

18. The non-transitory computer-readable storage medium of claim 12, the subgraph including a vertex that satisfies the vertex restriction but a path from the vertex to the first subset of vertices includes an edge in the second subset of edges.

19. A non-transitory computer-readable storage medium storing one or more sequences of instructions that, when executed by one or more computing devices, cause:

receiving graph data comprising a plurality of vertices and a plurality of edges connecting the plurality of vertices;

dividing the plurality of edges into a first subset of edges that meet a first criterion and a second subset of edges that do not meet the first criterion;

storing the plurality of vertices in memory, the first subset of edges in memory, and the second subset of edges in an external store;

receiving a request to search graph data, the request including a vertex restriction on a vertex in the graph data, an edge restriction on an edge in the graph data, and a subset of seed vertices of the plurality of vertices;

setting a running subset of vertices to the subset of seed vertices;

iteratively expanding the running subset of vertices by adding additional vertices of the plurality of vertices that are connected to the running subset of vertices via in-memory edges, retrieving edges of the second subset of edges that are connected to the running subset of vertices and satisfy the edge restriction, and adding additional vertices of the plurality of vertices that are connected to the running subset of vertices based on the retrieved edges;

transmitting, after the iteratively expanding, a response to the request based on the running subset of vertices and the retrieved edges.

20. The non-transitory computer-readable storage medium of claim 19, each edge of the plurality of edges having a dollar amount attribute, the edge restriction being a price range.

21. The non-transitory computer-readable storage medium of claim 19, the vertex restriction being no more than a certain number of edges away from a vertex in the subset of seed vertices.

22. The non-transitory computer-readable storage medium of claim 19, further comprising after the iteratively expanding, identifying a third subset of edges of the first subset of edges that are each connected to a pair of vertices in the running subset of vertices, the response including the running subset of vertices that satisfy the vertex restriction, the retrieved edges, and the third subset of edges.

* * * * *

UNITED STATES PATENT AND TRADEMARK OFFICE
CERTIFICATE OF CORRECTION

PATENT NO. : 11,829,419 B1
APPLICATION NO. : 17/744653
DATED : November 28, 2023
INVENTOR(S) : Psaroudakis et al.

It is certified that error appears in the above-identified patent and that said Letters Patent is hereby corrected as shown below:

In the Claims

In Column 9, Lines 34-35, in Claim 1, after "connected" delete "to the subgraph".

In Column 11, Lines 10-11, in Claim 12, after "connected" delete "to the subgraph".

Signed and Sealed this
Eighteenth Day of June, 2024

Katherine Kelly Vidal
*Director of the United States Patent and Trademark Office*